Patented Dec. 16, 1941

2,266,719

UNITED STATES PATENT OFFICE 2,266,719

PROCESS OF REFINING FAT-SOLUBLE VITAMIN-CONTAINING MATERIALS

Loran O. Buxton, Belleville, N. J., and Eric J. Simons, New York, N. Y., assignors to National Oil Products Company, Harrison, N. J., a corporation of New Jersey No Drawing. Application January 11, 1941, Serial No. 374,080

15 Claims. (Cl. 260—428)

This invention relates to a process for refining fat-soluble vitamin-containing materials, more particularly to the refining of fish liver oils and concentrates prepared therefrom by adsorption of undesirable constituents from said materials.

As is well known in the art, fat-soluble vitamin-containing oils and concentrates prepared therefrom have been used for a wide variety of useful purposes, particularly in the nutritional fields. However, many of these fat-soluble vitamin-containing materials, particularly products of a fish origin, have characteristic tastes and odors of an unpleasant nature; furthermore, the color of these materials is often dark, thus rendering the materials unattractive from a consumer standpoint. These undesirable properties have in some cases tended to limit the field of usefulness of these materials; as a result, there has been a great demand for a simple and effective process for removing the objectionable color, taste and odor therefrom.

To meet this demand a process for adsorbing the objectionable odor, taste and color from fat-soluble vitamin-containing materials has been developed. The process is disclosed and claimed in copending application Serial No. 227,599, filed August 30, 1938, in the name of Buxton, and involves contacting a solution of a fat-soluble vitamin-containing material with activated carbon under anaerobic conditions. Because of the excellent solubility of fat-soluble vitamin-containing materials in hydrocarbon and halogenated hydrocarbon solvents of a relatively non-polar nature, these substances are recommended for use as solvents for the fat-soluble vitamin-containing materials in this process. Our subsequent investigations have revealed, however, that when solutions of fat-soluble vitamin-containing materials in such solvents are contacted with certain of the adsorbents, particularly highly active ones such as activated earths and clays or blood charcoal, appreciable amounts of the valuable vitamins may be adsorbed along with the undesirable constituents and thereby lost.

It is an object of this invention to provide an improved process for removing color, taste and odor from the fat-soluble vitamin-containing materials.

It is a more specific object of this invention to provide a process for adsorbing color, taste and odor from fat-soluble vitamin-containing materials, which process may be advantageously employed with highly active adsorbents.

We have made the surprising discovery that the undesirable constituents contained in fat-soluble vitamin-containing materials which responsible for objectionable odor, color and taste may be removed therefrom without the loss of any of the valuable vitamins by dissolving the fat-soluble vitamin-containing material in a hydrocarbon or halogenated hydrocarbon solvent of a relatively non-polar nature and contacting the solution thus prepared with an adsorbent, provided the solvent employed contains a relatively small amount of an oxygen-containing organic compound having a polar functional grouping. The term "polar functional grouping" is employed herein to denote the functional grouping in a compound which tends to produce an unbalanced electronic structure and thereby activates the molecule and imparts a characteristic dipole moment thereto; examples of such polar functional groupings are the hydroxyl group, the carbonyl group, the carboxyl group, and the ester grouping. We have found that the incorporation of a compound of the above type in the hydrocarbon or halogenated hydrocarbon solvent employed effectively prevents any substantial adsorption of the fat-soluble vitamins even though the most highly active adsorbents are employed; furthermore, these compounds do not in any way inhibit or repress adsorption of the constituents responsible for the color, odor and taste of the fat-soluble vitamin-containing material. The preferred embodiment of our invention involves contacting a solution of a fish liver oil or concentrate prepared therefrom in a mixture containing a hydrocarbon or a halogenated hydrocarbon solvent of a relatively non-polar nature and less than 10% of a lower aliphatic alcohol under anaerobic conditions with a highly active adsorbent, such as blood charcoal or an activated earth or clay; by operating in this manner highly valuable products may be inexpensively produced from the readily available fish liver oils. The products produced by the process of our invention are almost completely devoid of objectionable color, taste and odor, but have practically the same vitamin content as the original material; hence these products will obviously be adaptable to a wide variety of uses.

The fat-soluble vitamin-containing materials which may be treated in accordance with our invention may be any material containing substantial quantities of the fat-soluble vitamins from which it may be desired to remove undesirable color, taste or odor; thus, for example, fish liver oils, such as cod liver oil, shark liver oil, ling cod liver oil, halibut liver oil, sword fish liver oil, etc., may be treated. Furthermore, concentrates prepared from these oils by saponification of the oil and extraction of the unsaponifiable fraction may also be advantageously processed by this invention; highly potent products prepared by subjecting fish liver oils to high vacuum distillation may also be treated with success. Other materials having objectionable color, odor and taste and containing vitamin A or D in either the alcohol or ester form, as well as materials containing the other fat-soluble vitamins, i. e. vitamins E and K, may also be advantageously treated; thus, for example, wheat germ oil may be refined by the process of this invention.

The adsorbents employed may be practically any adsorbent capable of removing constituents responsible for the objectionable color, taste or odor of a fat-soluble vitamine-containing material. Thus, for example, the various types of decolorizing carbons, e. g. blood charcoal or activated animal or vegetable charcoals, may be employed. Furthermore, earths or clays activated by treatment with acid or heat such as fuller's earth, "tonsil," and similar products may be used. Any one of the many aluminum oxide adsorbents known to the art may also be employed. Preferably the more highly active adsorbents such as blood charcoal or acid treated earths or clays, or mixtures of such adsorbents, are used, since the removal of the objectionable color, odor and taste is thereby rendered more efficient.

The fat-soluble vitamin-containing material may, in accordance with this invention, be contacted with the adsorbents in a variety of manners. Preferably the process is carried out under anaerobic conditions according to the procedure described in copending application Serial No. 227,599 of Buxton, filed August 30, 1938. In accordance with this procedure one of the adsorbents above mentioned is first thoroughly deaerated by agitating the adsorbent with the mixture to be used as the solvent for the fat-soluble vitamin-containing material. The solvent mixture employed should preferably consist of between about 90% and about 99% of a hydrocarbon or halogenated hydrocarbon solvent of a relatively non-polar nature, and between about 1% and about 10% of an oxygen-containing organic compound having a polar functional grouping. The hydrocarbon or halogenated hydrocarbon solvent used may be hexane, heptane, octane, ethylene dichloride, carbon tetrachloride, cyclohexane, methyl cyclohexane, benzene, similar solvents of a relatively non-polar nature, or mixtures thereof. Among the oxygen-containing solvents which may be employed are methyl alcohol, ethyl alcohol, propyl alcohol, isopropyl alcohol, benzyl alcohol, cyclohexanol, phenol, acetone, methylethyl ketone, acetaldehyde, propionaldehyde, methyl acetate, methyl formate, ethyl acetate, acetic acid and mixtures of such compounds; we prefer to employ the lower aliphatic alcohols such as methyl alcohol, ethyl alcohol or isopropyl alcohol, since these compounds are cheap, readily available and extremely effective. The deaeration is preferably accomplished by mixing the solvent mixture with the adsorbent in amounts such that the weight of the solvent mixture is at least four times, and preferably between about twenty and about forty times, the weight of the adsorbent, the particular amount of adsorbent varying with the amount of fat-soluble vitamin-containing material to be refined, and then agitating the mixture thoroughly until the air is expelled from the adsorbent and a solvent atmosphere created directly over the adsorbent to prevent access of air. Heat and reduced pressures may be applied to assist the deaeration, if desired. It is to be understood, however, that the deaeration may be carried out equally satisfactorily by agitating the adsorbent with the hydrocarbon or halogenated hydrocarbon solvent, and then adding the desired amount of the oxygen-containing solvent to the deaerated mass. Furthermore, it is not necessary to add all the solvent to the adsorbent prior to deaeration, since a portion can be used to deaerate the adsorbent and the remainder subsequently added to the mass either alone or along with the material to be refined. In any event at the termination of the deaeration treatment, entrapped air will be entirely expelled from the adsorbent and the vapors of the solvent will prevent air from contacting the adsorbent during the refining operation.

When the adsorbent has been deaerated, the fat-soluble vitamin-containing material to be refined may then be added to the deaerated mixture; the amount of material added should be such that the weight of fat-soluble vitamin-containing material is not greater than the weight of the solvent mixture, and preferably is between about 15% and about 20% of the weight of the solvent. The fat-soluble vitamin-containing material added may be dissolved in a solvent compatible with the solvent mixture in which the adsorbent is suspended; thus, for example, solutions containing fat-soluble vitamins such as those obtained by the solvent extraction of fish livers or fish liver oils may be treated. The mass may then be stirred for a suitable time, with the application of heat and vacuum, if desired, until adsorption of the undesirable constituents has been completed; it will be found that approximately one hour is usually sufficient to adsorb the bulk of the objectionable constituents from the fat-soluble vitamin-containing material. The suspended adsorbent may then be permitted to settle, the mass filtered and the residue washed with the particular solvent mixture employed in order to remove any fat-soluble vitamins from the adsorbents. The wash liquids may then be combined with the filtrate, the solvent evaporated and the refined fat-soluble vitamin-containing material thus recovered.

It is to be understood that the process of our invention may be modified somewhat. Thus, for example, the fat-soluble vitamin-containing material may be dissolved in a suitable solvent mixture of the type above described and this solution then percolated through a bed of an adsorbent, preferably one which has been deaerated by contact with a solvent of a type similar to that used for the material being refined; this method of operation has the advantage of being substantially continuous. If the fat-soluble vitamin-containing material to be refined contains free fatty acids, a portion of these may be removed prior to refining in accordance with the process described in our copending application Serial No. 227,600, filed August 30, 1938. The adsorbents used may contain filter aids to assist in their removal from the refined material. Other modifications may also be introduced without departing from the scope of this invention.

The following examples are illustrative of our invention; amounts are given in parts by weight.

*Example I*

2.5 parts of an adsorbent containing 1 part of an activated earth sold under the tradename of "Tonsil" and 1.5 parts of an activated carbon were deaerated by agitation with a mixture of 95 parts of ethylene dichloride and 5 parts of methyl alcohol. 25 parts of sword fish liver oil containing 171,000 A units per gram were added to the deaerated mass and the whole mixture stirred for about one hour. At the end of this time, the adsorbent was permitted to settle and was then filtered from the solution, washed with the solvent mixture employed, and the wash liquids combined with the filtrate; the solvent was then evaporated from the combined solutions, whereby a product having no objectionable color, taste or odor and containing 171,000 A units per gram was recovered. The same experiment carried out in the same manner except that no methyl alcohol was added to the solution yielded a product containing only 120,000 A units per gram.

*Example II*

5 parts of an activated earth sold under the tradename of "Tonsil" were deaerated by agitation with a mixture of 190 parts of cyclohexane and 10 parts of acetone. 50 parts of crude shark liver oil containing 105,000 A units per gram and having an objectionable color, taste and odor were then added to the mixture and the whole mass stirred for 30 minutes. The refined oil was then recovered as described in Example I. The resulting product contained 106,000 A units per gram and had a pleasant color, taste and odor. The same experiment conducted in the absence of the acetone yielded a product containing only 100,000 A units per gram.

*Example III*

10 parts of a decolorizing carbon sold under the tradename of "Darco S-51" were deaerated by agitation with a mixture of 190 parts of heptane and 10 parts of methanol. 50 parts of crude shark liver oil containing 67,000 A units per gram and having an objectionable color, taste and odor were then added to the mixture and the whole mass stirred for 30 minutes. The refined oil was then recovered as described in Example I. The resulting product contained 67,400 A units per gram and had a pleasant color, odor and taste. The same experiment carried out in the absence of methanol yielded a product having a vitamin potency of only 60,600 A units per gram.

From the above description it will be evident that the process of our invention permits the more successful refining of fat-soluble vitamin-containing materials by the adsorption method. By reason thereof, this process will be of great value to the industry.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent, is:

1. In a process for refining a fat-soluble vitamin-containing material by contacting a solution of said material in a solvent selected from the group consisting of hydrocarbon and halogenated hydrocarbon solvents of a relatively non-polar nature with an adsorbent, the improvement which comprises incorporating in the solution a relatively small amount of an oxygen-containing organic compound having a polar functional grouping.

2. In a process for refining a fat-soluble vitamin-containing material by contacting a solution of said material in a solvent selected from the group consisting of hydrocarbon and halogenated hydrocarbon solvents of a relatively non-polar nature with an adsorbent, the improvement which comprises incorporating in the solution an amount of an oxygen-containing organic compound having a polar functional grouping equivalent to less than about 10% of the relatively non-polar solvent employed.

3. In a process for refining a fat-soluble vitamin-containing material by contacting a solution of said material in a solvent selected from the group consisting of hydrocarbon and halogenated hydrocarbon solvents of a relatively non-polar nature with an adsorbent, the improvement which comprises incorporating in the solution a relatively small amount of a lower aliphatic alcohol.

4. In a process for refining a fat-soluble vitamin-containing material by contacting a solution of said material in a solvent selected from the group consisting of hydrocarbon and halogenated hydrocarbon solvents of a relatively non-polar nature with an adsorbent under anaerobic conditions, the improvement which comprises incorporating in the solution a relatively small amount of an oxygen-containing organic compound having a polar functional grouping.

5. In a process for refining a crude fish liver oil by contacting a solution of said oil in a solvent selected from the group consisting of hydrocarbon and halogenated hydrocarbon solvents of a relatively non-polar nature with an adsorbent under anaerobic conditions, the improvement which comprises incorporating in the solution a relatively small amount of an oxygen-containing organic compound having a polar functional grouping.

6. A process for refining a fat-soluble vitamin-containing material, which comprises forming a deaerated mixture of an adsorbent and a solvent containing a substance selected from the group consisting of hydrocarbon and halogenated hydrocarbon solvents of a relatively non-polar nature and an oxygen-containing organic compound having a polar functional grouping, adding the fat-soluble vitamin-containing material to said mixture, agitating the mass, removing the adsorbent, and recovering the refined material.

7. A process for refining a crude fish liver oil, which comprises forming a deaerated mixture of an adsorbent and a solvent containing a substance selected from the group consisting of hydrocarbon and halogenated hydrocarbon solvents of a relatively non-polar nature and less than about 10% of an oxygen-containing organic compound having a polar functional grouping, adding the fish liver oil to the deaerated mixture, agitating the mass, removing the adsorbent, and recovering the refined fish liver oil.

8. A process for refining a crude fish liver oil, which comprises forming a deaerated mixture of an adsorbent and a solvent containing a substance selected from the group consisting of hydrocarbon and halogenated hydrocarbon solvents of a relatively non-polar nature and less than about 10% of a lower aliphatic alcohol, adding the fish liver oil to the deaerated mixture, agitating the mass, removing the adsorbent, and recovering the refined fish liver oil.

9. A process for refining a crude fish liver oil, which comprises deaerating an adsorbent by agitation with a solvent mixture containing a substance selected from the group consisting of hydrocarbon and halogenated hydrocarbon solvents of a relatively non-polar nature and an oxygen-containing organic compound having a polar functional grouping, adding the fish liver oil to the deaerated mixture, agitating the mass, removing the adsorbent, and recovering the refined fish liver oil.

10. A process for refining a crude fish liver oil, which comprises deaerating an adsorbent by agitation with a solvent mixture containing a substance selected from the group consisting of hydrocarbon and halogenated hydrocarbon solvents of a relatively non-polar nature and less than about 10% methyl alcohol, adding the fish liver oil to the deaerated mixture, agitating the mass, removing the adsorbent, and recovering the refined fish liver oil.

11. A process for refining a crude fish liver oil, which comprises deaerating an adsorbent by agitation with a solvent mixture containing a substance selected from the group consisting of hydrocarbon and halogenated hydrocarbon solvents of a relatively non-polar nature and less than about 10% isopropyl alcohol, adding the fish liver oil to the deaerated mixture, agitating the mass, removing the adsorbent, and recovering the refined fish liver oil.

12. A process for refining a crude fish liver oil, which comprises deaerating an adsorbent by agitation with a solvent mixture containing a substance selected from the group consisting of hydrocarbon and halogenated hydrocarbon solvents of a relatively non-polar nature and less than about 10% acetone, adding the fish liver oil to the deaerated mixture, agitating the mass, removing the adsorbent, and recovering the refined fish liver oil.

13. A process for refining fish liver oils, which comprises deaerating an adsorbent containing an activated carbon and an activated earth by agitation with a solvent mixture containing ethylene dichloride and less than about 10% methyl alcohol, adding the fish liver oil to the deaerated mixture, agitating the mass, removing the adsorbent, and recovering the refined fish liver oil.

14. A process for refining fish liver oils, which comprises deaerating an adsorbent containing an activated carbon and an activated earth by agitation with a solvent mixture containing heptane and less than about 10% isopropyl alcohol, adding the fish liver oil to the deaerated mixture, agitatting the mass, removing the adsorbent, and recovering the refined fish liver oil.

15. A process for refining fish liver oils, which comprises deaerating an adsorbent containing an activated carbon and an activated earth by agitation with a solvent mixture containing cyclohexane and less than about 10% acetone, adding the fish liver oil to the deaerated mixture, agitating the mass, removing the adsorbent, and recovering the refined fish liver oil.

LORAN O. BUXTON.
ERIC J. SIMONS.